United States Patent
Ashworth et al.

(10) Patent No.: US 10,979,130 B2
(45) Date of Patent: Apr. 13, 2021

(54) AMPLIFICATION ADJUSTMENT TECHNIQUES FOR A WIRELESS REPEATER

(71) Applicant: WILSON ELECTRONICS, LLC, St. George, UT (US)

(72) Inventors: Christopher Ken Ashworth, Toquerville, UT (US); Casey James Nordgran, Ivins, UT (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

(21) Appl. No.: 16/687,505

(22) Filed: Nov. 18, 2019

(65) Prior Publication Data
US 2020/0083949 A1    Mar. 12, 2020

Related U.S. Application Data

(63) Continuation of application No. 15/893,160, filed on Feb. 9, 2018, now abandoned.

(60) Provisional application No. 62/457,108, filed on Feb. 9, 2017.

(51) Int. Cl.
  H04B 7/15    (2006.01)
  H04B 7/155   (2006.01)
  H04W 84/04   (2009.01)

(52) U.S. Cl.
  CPC ....... *H04B 7/15578* (2013.01); *H04W 84/042* (2013.01)

(58) Field of Classification Search
  CPC .............. H04B 7/155; H04B 7/15578; H04B 7/15564; H04W 84/042
  See application file for complete search history.

(56) References Cited

U.S. PATENT DOCUMENTS

| | | |
|---|---|---|
| 4,776,032 A | 10/1988 | Odate et al. |
| 5,303,395 A | 4/1994 | Dayani |
| 5,737,687 A | 4/1998 | Martin et al. |
| 5,777,530 A | 7/1998 | Nakatuka |
| 5,835,848 A | 11/1998 | Bi et al. |
| 6,005,884 A | 12/1999 | Cook et al. |
| 6,711,388 B1 | 3/2004 | Neitiniemi |
| 6,889,033 B2 | 5/2005 | Bongfeldt |
| 6,990,313 B1 | 1/2006 | Yarkosky |

(Continued)

FOREIGN PATENT DOCUMENTS

EP    1525678 B1    7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

(Continued)

*Primary Examiner* — Dong-Chang Shiue
(74) *Attorney, Agent, or Firm* — Thorpe North & Western

(57) ABSTRACT

Techniques for configuring a repeater are disclosed. An independent oscillation reduction factor for reducing oscillation in the repeater can be determined when an overload protection is disabled at the repeater. The oscillation can be caused by feedback of one or more signals between a donor port and a server port of the repeater. The independent oscillation reduction factor can be indicated for use in determining an antenna installation location or orientation.

32 Claims, 6 Drawing Sheets

(56) References Cited

U.S. PATENT DOCUMENTS

| | | | |
|---|---|---|---|
| 6,993,287 B2* | 1/2006 | O'Neill | H04B 7/15535 455/11.1 |
| 7,035,587 B1 | 4/2006 | Yarkosky | |
| 7,221,967 B2 | 5/2007 | Van Buren et al. | |
| 7,974,573 B2 | 7/2011 | Dean | |
| 2002/0044594 A1 | 4/2002 | Bongfeldt | |
| 2003/0123401 A1 | 7/2003 | Dean | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0235417 A1 | 11/2004 | Dean | |
| 2005/0118949 A1 | 6/2005 | Allen et al. | |
| 2006/0084379 A1 | 4/2006 | O'Neill | |
| 2007/0071128 A1 | 3/2007 | Meir et al. | |
| 2007/0188235 A1* | 8/2007 | Dean | H04B 7/15578 330/278 |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2008/0293360 A1 | 11/2008 | Maslennikov et al. | |
| 2011/0151775 A1 | 6/2011 | Kang et al. | |
| 2013/0082781 A1 | 4/2013 | Van Buren et al. | |
| 2014/0274193 A1 | 9/2014 | Ashworth et al. | |

OTHER PUBLICATIONS

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

* cited by examiner

AMPLIFICATION ADJUSTMENT TECHNIQUES FOR A WIRELESS REPEATER

CROSS-REFERENCE TO RELATED APPLICATIONS

This application is a continuation of U.S. patent application Ser. No. 15/893,160 filed Feb. 9, 2018, which claims the benefit of U.S. Provisional Patent Application No. 62/457,108 filed Feb. 9, 2017, the entire specifications of which is hereby incorporated by reference in their entirety for all purposes.

BACKGROUND

Wireless communication systems, such as cellular telephone systems, have become common throughout the world. A wireless repeater or booster is a radio frequency (RF) device used to amplify wireless communication signals in both uplink and downlink communication channels, as illustrated in FIG. 1. The uplink channel is generally referred to as the direction from one or more wireless user devices 110 to a base station 120. The downlink channel is generally referred to as the direction from the base station 120 to the user device 110. For a wireless telephone system, the base station 120 can be a cell tower, and the user devices 110 can be one or more smart phones, tablet, laptop and desktop computers, multimedia devices such as televisions or gaming systems, cellular internet of things (CIoT) devices, or other types of computing devices. The repeater 130 typically includes a signal amplifier 140 coupled between two antennas, a server-side antenna 150 and a donor-side antenna 160. Constraints imposed by government agencies, industry standards, or similar regulatory entities can limit the amount of amplification (gain), the maximum output power, the output noise, and other parameters associated with the operation of the repeater 130. Therefore, there is a continuing need for improved wireless repeaters.

DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
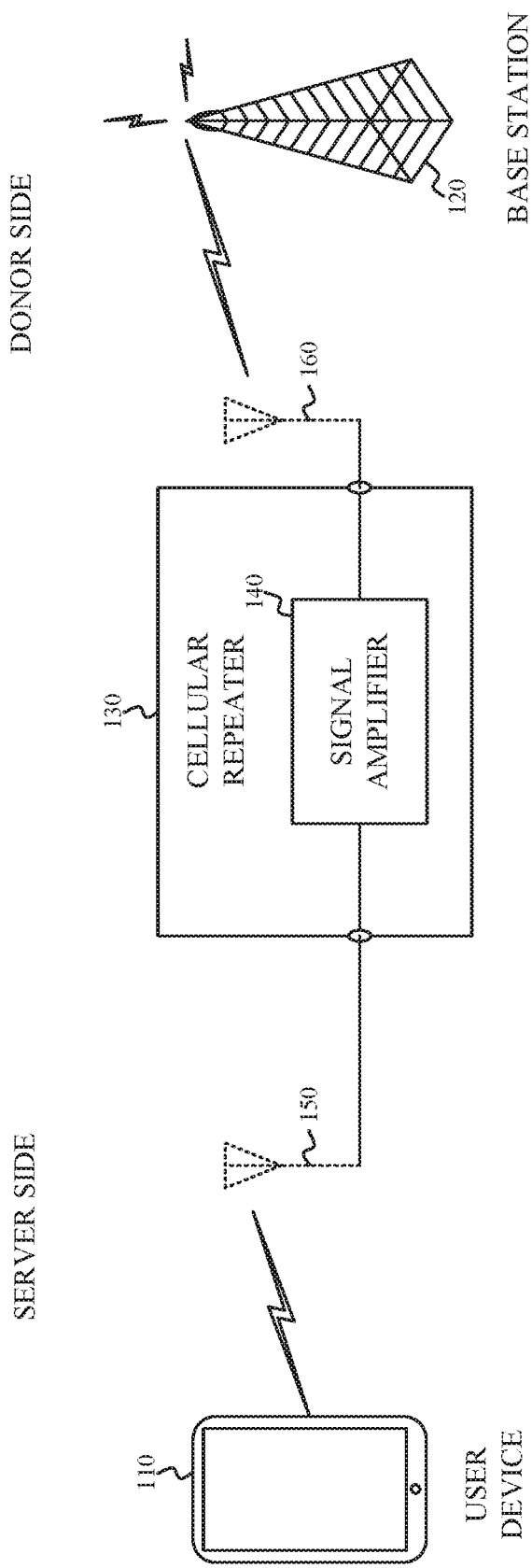
FIG. 1 depicts a wireless system, in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION OF THE INVENTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

An initial overview of technology embodiments is provided below, and then specific technology embodiments are described in further detail later. This initial summary is intended to aid readers in understanding the technology more quickly but is not intended to identify key features or essential features of the technology nor is it intended to limit the scope of the claimed subject matter.

In one aspect, repeaters for use in cellular telephone systems can automatically receive, amplify and retransmit on a bi-directional basis signals received from base, fixed, mobile, or portable stations, with no change in frequency or authorized bandwidth. The repeater can provide improved wireless coverage within a limited area such as a home, office building, car, boat or recreational vehicle (RV). The repeater can operate on the frequencies and in the market areas of a specified licensee service provider, or on the frequencies or in the market areas of multiple licensee service providers.

In one aspect, configuring an amplification factor of the repeater during installation of one or more antennas can include determining an oscillation reduction factor for reducing oscillation caused by feedback in the repeater. The oscillation reduction factor can be indicated to an installer for use in determining an optimal antenna installation location and/or orientation. In one aspect, the amplification factor can be adjusted based on the determined oscillation reduction factor.

In another aspect, an overload or noise floor factor can be determined based on a power level of one or more downlink signals at the repeater. The overload or noise floor factor can also be indicated to the installer. In one aspect, the amplification factor can be adjusted based on a greater of the determined oscillation reduction factor or the overload or noise floor factor.

Figure 2:
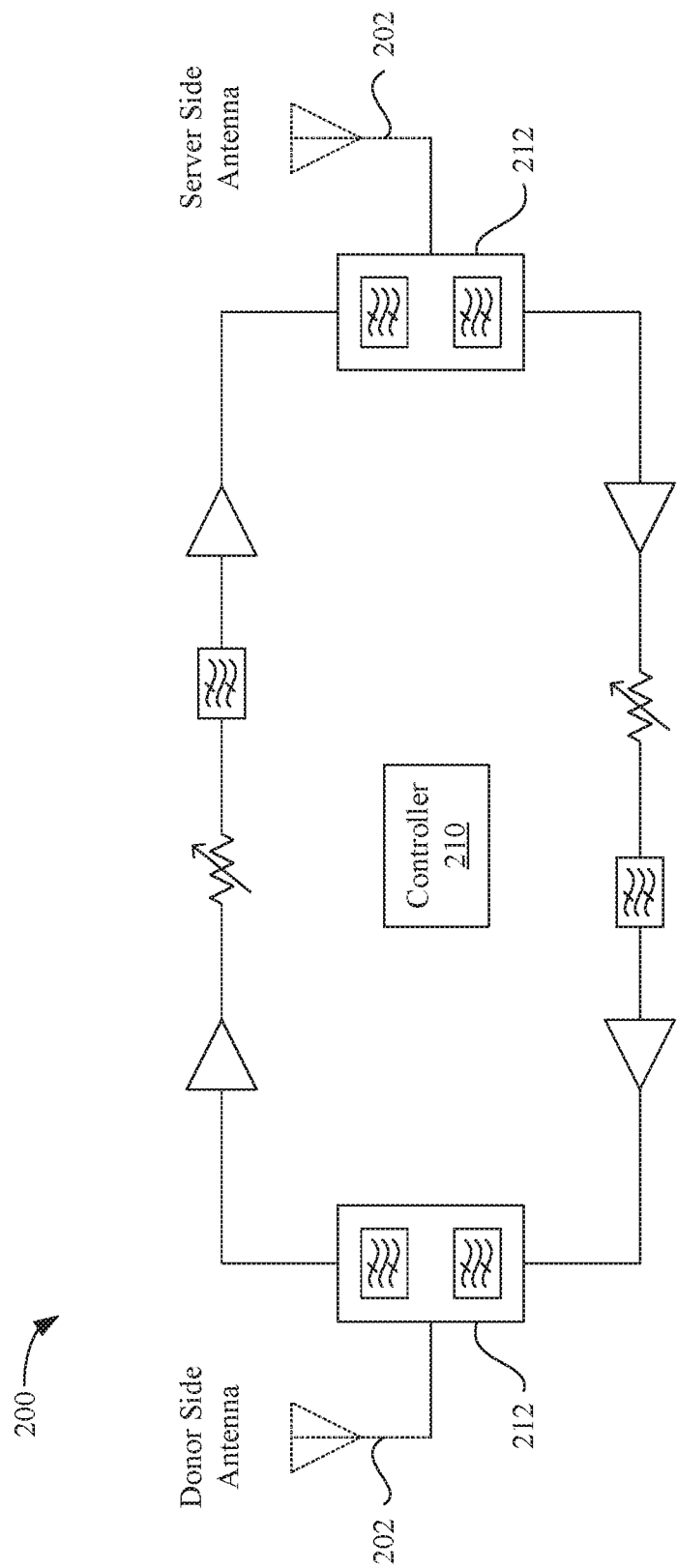
FIG. 2 depicts a bi-directional amplifier in accordance with an example.

As illustrated in FIG. 2, a repeater can comprise a server side antenna 202 and a donor side antenna 204. The server side antenna can be coupled to a diplexer or duplexer 212. The donor side antenna can be coupled to a diplexer or duplexer 214. A first path can comprise a low noise amplifier (LNA), a variable attenuator, a filter, and a power amplifier (PA). The LNA can amplify a low power signal without degrading the signal to noise ratio. A PA can adjust and amplify the power level by a desired amount. A second path can comprise an LNA, a variable attenuator, a filter, and a PA. The first path can be a downlink amplification path or an uplink amplification path. The second path can be a downlink amplification path or an uplink amplification path. The repeater 200 can also comprise a controller 210. In one example, the controller 210 can include one or more processors and memory.

Figure 3:
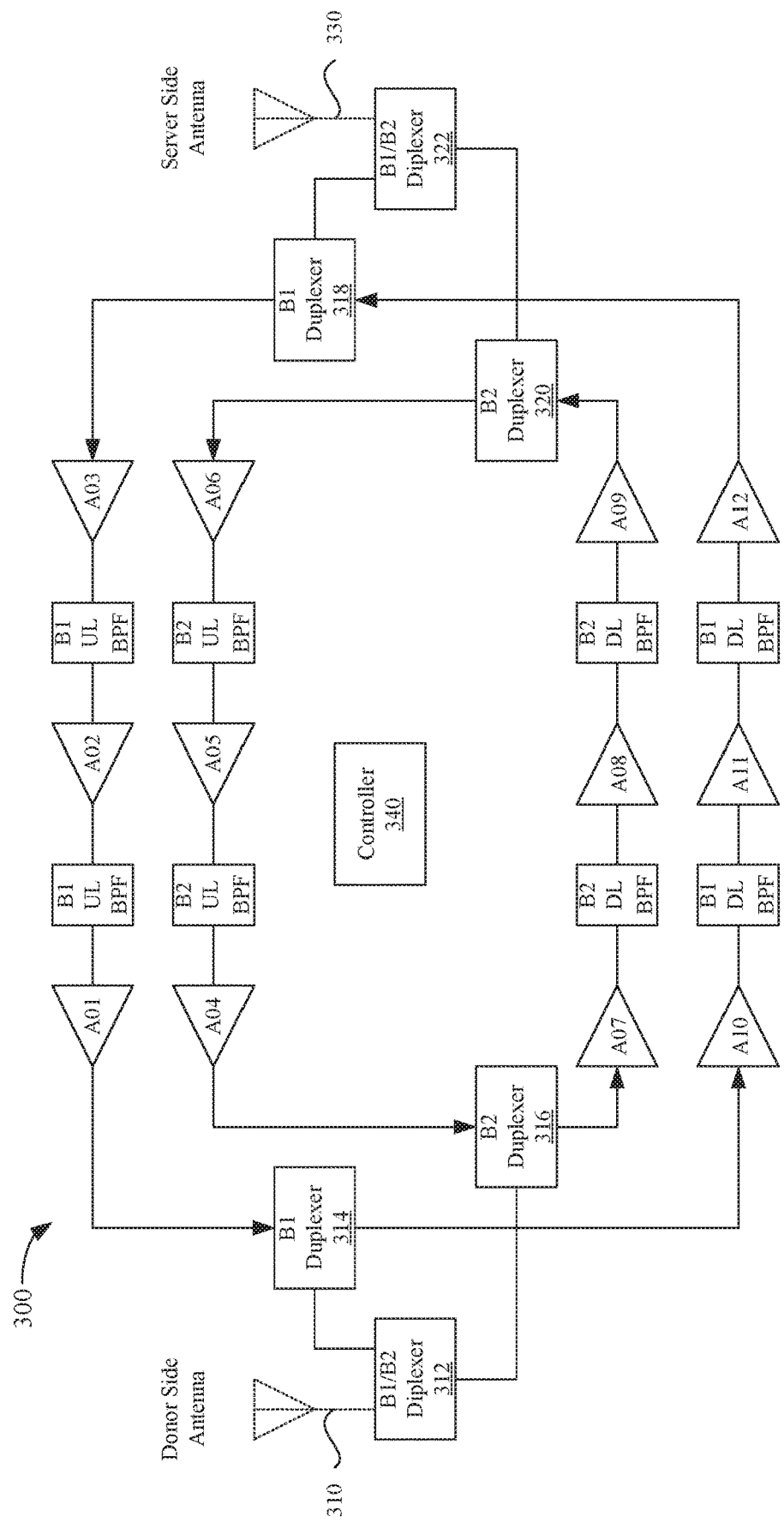
FIG. 3 depicts a multi-band bi-directional amplifier in accordance with an example.

As illustrated in FIG. 3, in another example, a repeater can be a bi-directional wireless signal booster 300 configured to amplify an uplink signal and a downlink signal using a separate signal path for each uplink frequency band and downlink frequency band. A donor side antenna 310, or an integrated node antenna, can receive a downlink signal. For example, the downlink signal can be received from a base station. The downlink signal can be provided to a first B1/B2 diplexer 312, wherein B1 represents a first frequency band and B2 represents a second frequency band. The first B1/B2 diplexer 312 can create a B1 downlink signal path and a B2 downlink signal path. Therefore, a downlink signal that is associated with B1 can travel along the B1 downlink signal path to a first B1 duplexer 314, or a downlink signal that is associated with B2 can travel along the B2 downlink signal path to a first B2 duplexer 316. After passing the first B1 duplexer 314, the downlink signal can travel through a series of amplifiers (e.g. A10, A11, and A12) and downlink bandpass filters (BPF) to a second B1 duplexer 318. Alternatively, after passing the first B2 duplexer 316, the downlink signal can travel through a series of amplifiers (e.g. A07, A08, and A09) and downlink band pass filters (BPF) to a second B2 duplexer 320. At this point, the downlink signal (B1 or B2) has been amplified and filtered in accordance with the type of amplifiers and BPFs included in the bi-directional wireless signal booster 300. The downlink signals from the second B1 duplexer 318 or the second B2 duplexer 320, respectively, can be provided to a second B1/B2 diplexer 322. The second B1/B2 diplexer 322 can provide an amplified downlink signal to a server side antenna 330, or an integrated device antenna. The server side antenna 330 can communicate the amplified downlink signal to a wireless device, such as a UE.

In another example, the server side antenna 330 can receive an uplink (UL) signal from a wireless device. The uplink signal can be provided to the second B1/B2 diplexer 322. The second B1/B2 diplexer 322 can create a B1 uplink signal path and a B2 uplink signal path. Therefore, an uplink signal that is associated with B1 can travel along the B1 uplink signal path to a second B1 duplexer 318, or an uplink signal that is associated with B2 can travel along the B2 uplink signal path to a second B2 duplexer 320. After passing the second B1 duplexer 318, the uplink signal can travel through a series of amplifiers (e.g. A01, A02, and A03) and uplink bandpass filters (BPF) to the first B1 duplexer 314. Alternatively, after passing the second B2 duplexer 320, the uplink signal can travel through a series of amplifiers (e.g. A04, A05, and A06) and downlink band pass filters (BPF) to the first B2 duplexer 316. At this point, the uplink signal (B1 or B2) has been amplified and filtered in accordance with the type of amplifiers and BPFs included in the bi-directional wireless signal booster 300. The uplink signals from the first B1 duplexer 314 or the first B2 duplexer 316, respectively, can be provided to the first B1/B2 diplexer 312. The first B1/B2 diplexer 312 can provide an amplified uplink signal to the donor side antenna 310, or an integrated device antenna. The donor side antenna 310 can communicate the amplified uplink signal to a base station. The repeater 300 can also include a controller 340. In one example, the controller 340 can include one or more processors and memory.

Figure 4:
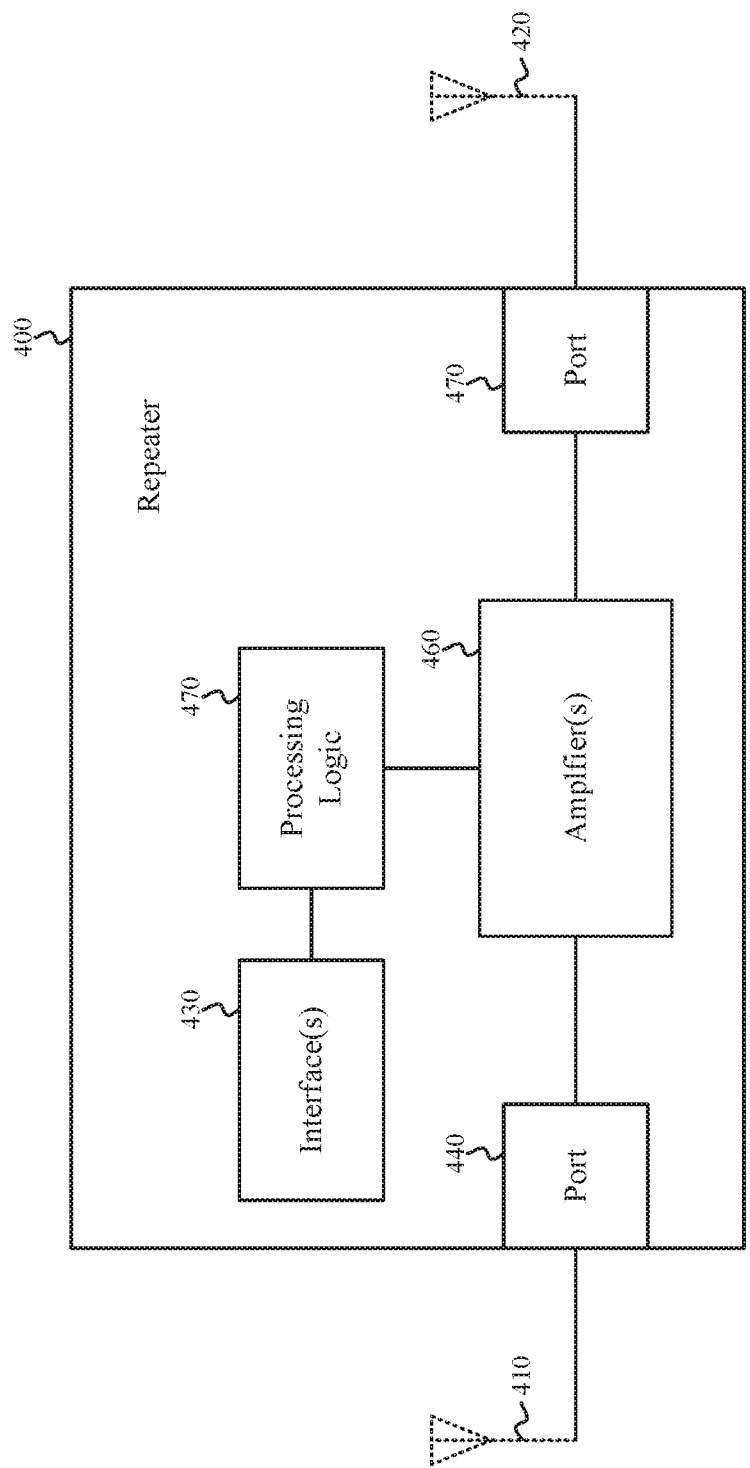
FIG. 4 depicts a repeater configured for optimizing gain during installation of one or more antennas, in accordance with an example.

FIG. 4 depicts a repeater configured for optimizing gain during installation of one or more antennas. In one aspect, the repeater 400 can be coupled between a first antenna 410 and second antenna 420. The antennas 410, 420 can be removably coupled to the repeater 400 (e.g., remote external antennas), optionally by one or more wired communication links (e.g., coaxial cable). Alternatively, one or the other of the antennas 410, 420 can be integral to the repeater 400 (e.g., internal or directly coupled external antenna). The first and second antennas 410, 420 can be directional antennas or omni-directional antennas. In one instance, the first antenna 410 can be a donor side antenna adapted for placement outside a structure and the second antenna 420 can be a server side antenna adapted for placement inside the structure. In one instance, the first antenna 410 can be a directional antenna and the second antenna 420 can be either a directional or omni-directional antenna.

In one aspect, the repeater 400 can include one or more interfaces 430, a plurality of ports 440, 450, one or more one or more amplifiers 460, and processing logic 470. In one instance, the processing logic 470 can be coupled between the one or more interfaces 430 and the one or more amplifiers 460. In one instance, the processing logic can be implemented in a controller, such as the controller 210, 310 in FIGS. 2 and 3, respectively. In one instance, the one or more amplifiers 460 can be coupled between a first port 440 and a second port 450. The first port 440 may be referred to as a donor port, service provider-side port, or wireless network-side repeater port, and the second port 450 may be referred to as a server port, subscriber-side port or device-side repeater port. In one instance, one or more downlink amplifiers can be coupled between the donor port 440 and server port 450, and one or more uplink amplifiers can be coupled between the donor port 440 and the server port 450. In one instance, the one or more amplifiers 460 can be configured to amplify one or more RF communication signals. In one instance, the RF communication signals can be cellular telephone RF signals, such as a Third-Generation Partnership Project (3GPP) Long Term Evolved (LTE) signals. In one instance, the one or more amplifiers 460 can be configured to amplify both uplink and downlink 3GPP LTE signals of one or more carrier bands. In one instance, the uplink 3GPP LTE signals can operate at a first frequency band and the downlink 3GPP LTE signal can operate at a second frequency band. Alternatively, the uplink 3GPP LTE signal can be from a first channel of a selected band, and the downlink 3GPP LTE signal can be from a second channel of the selected band. In one instance the operating bands of the RF communication signals can include:

TABLE 1

| | Bands of Operation | | | | | |
|---|---|---|---|---|---|---|
| | Uplink | | | Downlink | | |
| Band | Fmin (MHz) | Fmax (MHz) | Fc (MHz) | Fmin (MHz) | Fmax (MHz) | Fc (MHz) |
| II | 1850.0-1910.0 | | 1880.0 | 1930.0-1990.0 | | 1960.0 |
| IV | 1710.0-1755.0 | | 1732.5 | 2110.0-2155.0 | | 2132.5 |
| V | 824.0-849.0 | | 836.5 | 869.0-894.0 | | 881.5 |
| XII | 699.0-716.0 | | 707.5 | 729.0-746.0 | | 737.5 |
| XIII | 776.0-787.0 | | 781.5 | 746.0-757.0 | | 751.5 |

In one configuration, the repeater 400 can improve the wireless connection between the wireless device 110 and the base station 120 (e.g., cell tower) or another type of wireless wide area network (WWAN) access point (AP). The repeater 400 can boost signals for cellular standards, such as the Third Generation Partnership Project (3GPP) Long Term Evolution (LTE) Release 8, 9, 10, 11, 12, 13, 14 or 15 standards or Institute of Electronics and Electrical Engineers (IEEE) 802.16. In one configuration, the repeater 400 can boost signals for 3GPP LTE Release 14.0.0 (June 2017) or other desired releases. In one example the operating bands of the RF communication signals can include any of bands 1-76, as described by 3GPP Technical Specification (TS) 36.101, Version 15.1.0 (Jan. 18, 2018). This example is not intended to be limiting. New bands for 3GPP LTE operation are frequently disclosed. The repeater 400 can be configured to amplify any desired band that may be used by a wireless mobile device. The repeater 400 can also be configured to simultaneously filter and amplify a plurality of bands simultaneously. For example, the repeater 400 may be configured to simultaneously amplify the bands described in Table 1.

In one aspect, the one or more interfaces 430 can include one or more user interfaces, one or more communication interfaces, and/or the like. In one instance, the user interface can include one or more lights, or a display for outputting one or more indications. The user interface can also include one or more buttons, switches, keys or the like for receiving one or more inputs.

In one aspect, various functions of the processing logic 470 can be implemented in hardware, firmware, software stored in memory and executed by one or more processing units, and/or any combination thereof.

In one aspect, the processing logic 470 can be configured to determine an oscillation reduction factor for reducing oscillation caused by feedback of one or more signals through one or more amplifiers 460 of the repeater 400. For example, the processing logic 470 can determine if a signal transmitted either on the uplink to the base station or on the downlink to a UE is feeding back into the repeater 400 and causing oscillation within the repeater. The feedback oscillation can increase the noise in the repeater, saturate the amplifiers of the repeater, or the like, thereby decreasing the performance of the repeater 400 or potentially damaging the repeater 400. During placement and orientation of the first and second antennas 410, 420, for example, oscillation caused by feedback through the one or more amplifiers 460 can occur if the antennas are too close to each other. The processing logic 470 can determine an oscillation reduction factor needed for adjusting an amplification factor of the repeater 400 to reduce the oscillation below a specified level.

In one aspect, the processing logic 470 can be further configured to indicate on the one or more interfaces 430 the oscillation reduction factor for reducing feedback oscillation. The processing logic 470 can, for example, output the determined oscillation reduction factor on a display of a user interface to assist a user with determining an optimal antenna location and/or orientation.

In one aspect, the processing logic 470 can be further configured to determine an overload or noise floor factor based on a power level of the one or more signals received by the repeater 400. For example, the processing logic 470 can determine a strength of one or more downlink signals received at a port 440 from a base station. The strength of the one or more downlink signals can be used to configure a maximum transmit power level of the repeater to prevent damage to the receiver of the base station, prevent interference with the ability of other user devices to communicate with the base station, to prevent an increase in a noise floor of the wireless network, or the like. Therefore, when the downlink signal strength from the base station is determined to be less than or equal to a predetermined level, the overload or noise floor factor can be substantially zero. When the downlink signal strength from the base station is greater than the predetermined level, the overload or noise floor factor can be a function of the downlink signal strength. For instance, for each 1 decibel (dB) that the signals received from the base station are above a predetermined level, the overload or noise floor factor can correspond to a 1 dB reduction.

In one aspect, the processing logic 470 can be further configured to indicate on the one or more interfaces 430 the overload or noise floor reduction factor. The processing logic 470 can, for example, output the determined overload or noise floor reduction factor on a display of the user interface to assist a user with determining an optimal antenna location and/or orientation.

In one aspect, the processing logic 470 can be further configured to adjust an amplification factor of the one or more amplifiers 460 based on the determined oscillation reduction factor. For example, in response to an oscillation reduction factor of −30 dB for reducing oscillation due to feedback in the repeater, the amplification factor of the one or more amplifiers can be reduced by a corresponding −30 dB.

In another aspect, the processing logic 470 can be further configured to adjust the amplification factor of the one or more amplifiers 460 based on a greater of the determined oscillation reduction factor or the determined overload or noise floor reduction factor. For example, in response to an overload or noise floor factor of −25 dB and an oscillation reduction factor of −15 dB, the amplification factor of the one or more amplifiers can be reduced by −25 dB to prevent damage to the receiver of the base station, prevent interference with the ability of other user devices to communicate with the base station, to prevent an increase in a noise floor of the wireless network, or the like. At the same time the −25 dB amplification factor also will result in the reduction of oscillation. In another example, when an overload or noise floor factor of −5 dB is determined and an oscillation reduction factor of −20 dB is determined, the amplification factor of the one or more amplifiers can be reduced by −20 dB.

In another aspect, the processing logic 470 can be further configured to adjust the amplification factor of the one or more amplifiers 460 based on the determined oscillation reduction factor, while not adjusting the amplification factor based on the determined overload or noise floor reduction factor for a specified period of time. For example, in response to an overload or noise floor factor of −25 dB and an oscillation reduction factor of −15 dB, the amplification factor of the one or more amplifiers can be reduced by −15 dB for a specified period of time during an install period. After the specified period of time during the install period, the amplification factor of the one or more amplifiers can be reduced by −25 dB. By not adjusting the amplification factor based on the determined overload or noise floor reduction factor for a limited period of time, the oscillation reduction factor can be determined. Likewise, adjustment of the amplification factor based on any criteria other than the oscillation reduction factor can be disabled, so that the amplification factor is based just on the determined oscillation reduction factor.

In another aspect, the processing logic 470 can determine an independent oscillation reduction factor and an independent overload or noise floor reduction factor. In other words, the processing logic 470 can determine the oscillation reduction factor and the overload or noise floor reduction factor separately or independent of each other. The processing logic 470 can determine the independent oscillation reduction factor when an overload protection is disabled, and the processing logic 470 can determine the independent overload or noise floor reduction factor when an oscillation protection is disabled.

As an example, a user can install a signal booster in a vehicle at a selected location, such as the user's home. The location may be located near a base station, which will result in a downlink signal with a relatively high power at the signal booster. In this example, when the user installs the signal booster, the signal booster may reduce the uplink gain for overload protection of the nearby base station. In this situation, the signal booster can reduce its uplink gain based on a measurement of a relatively high downlink (DL) received signal strength indicator (RSSI). When the car is driven away from the location near the base station, the downlink signal strength will decrease. The uplink signal gain can then be increased at the signal booster. However, the increase of the gain in the uplink signal path can lead to an oscillation in the signal booster. The oscillation can be caused by the server side antenna and the donor side antenna located too closely. In this situation, the user should have installed the signal booster antennas differently. The user could have done so if the signal booster did not have an overload indication that automatically reduced the gain of the uplink signal. Accordingly, the overload indication prevented the user from checking and installing the signal booster optimally for situations in which the uplink gain is increased.

Therefore, it can be advantageous for the processing logic 470 to determine an independent oscillation reduction factor when an overload protection is disabled, as well as an independent overload or noise floor reduction factor when an oscillation protection is disabled.

In another aspect, the processing logic 470 can be further configured to adjust the amplification factor applied to one or more downlink signals by the one or more amplifiers 460 based on the determined oscillation reduction factor and optionally any other criteria, while the amplification factor applied to one or more uplink signals by the one or more amplifier is significantly reduced to prevent an overload or noise floor increase of the base station. Similarly, the processing logic 470 can be further configured to adjust the amplification factor applied to one or more downlink signals by the one or more amplifiers based on a greater of the determined oscillation reduction factor or the overload or noise floor factor, while the amplification factor applied to one or more uplink signals by the one or more amplifiers 460 is significantly reduced to prevent an overload or noise floor increase of the base station.

In another aspect, the processing logic 470 can be further configured to determine the oscillation reduction factor, while the amplification factor of the one or more amplifiers is not adjusted based on the determined overload or noise floor reduction factor. In another aspect, the processing logic 470 can be further configured to turn off one or more uplink signals during the install period to prevent overload of the base station during the install period. In another aspect, the amplification factor of the repeater based on the oscillation reduction factor can be adjusted from a bumped-up gain level.

In one aspect, the processing logic 470 can be further configured to receive an input from a user indicating a new antenna installation location and/or orientation. For example, in response to a first placement and orientation of the antennas 410, 420, an amplification factor of −30 dB based on an oscillation reduction factor determined for the first antenna location and orientation can be output on the user interface. With the amplification reduction factor information, the user can try different antenna locations and/or orientations to reduce the amplification reduction factor and thereby increase the operating gain of the repeater 400. For example, the user may move the first and/or second antenna to a second placement and/or orientation and provide an input through one or more keys or buttons of the user interface to indicate the new placement and/or orientation. In response to the second placement, a determined amplification factor of −10 dB based on an oscillation reduction factor determined for the second antenna location and orientation can be output on the user interface. In one aspect, the processes of determining and outputting an indication of the oscillation reduction level, and optionally the overload or noise floor factor, and corresponding adjustment of the amplification factor as appropriate can be repeated in response to each input indicative of a new antenna installation location and/or orientation. In another instance, the indication of the new antenna installation location and/or orientation can be received from an accelerometer placed in the antennas.

It is to be appreciated that it can be helpful to a user, when determining an optimal antenna location, to know the amplification factor based on feedback oscillation even when the amplification factor based on the overload or noise floor factor is the dominant factor. For example, it is common for the strength of the signals transmitted between a base station and one or more user devices to vary over time. For example, the signal strength may be greater at night then during the day. The signal strength may be weaker on rainy days then it is during clear sunny days. The signal strength may be stronger in the winter when leaves have fallen from the trees then in the summer when the trees have leaves on them. The signal strength may decrease after one or more buildings have been constructed between the wireless devices. By determining and outputting the oscillation reduction factor during an installation period, the oscillation reduction factor can be minimized, thereby optimizing the performance of the repeater even as operating conditions vary after the installation period.

For example, an installer may install the repeater 400 when the downlink signal at the receiver 400 is strong. If the signal strength of the downlink signal backs off (becomes weaker) at a later time during regular operation of the repeater 400, the isolation between the antennas 410, 420 of the repeater 400 may become a factor. When the downlink signal strength becomes weaker, the gain of the repeater 400 can increase because of the corresponding lower overload or noise floor factor, and as a result feedback oscillations can occur. If the isolation between the antennas 410, 420 is optimized to reduce the oscillation reduction factor, the gain of the repeater 400 can be improved during periods when the overload or noise floor factor is not the basis for the amplification factor.

Figure 5:
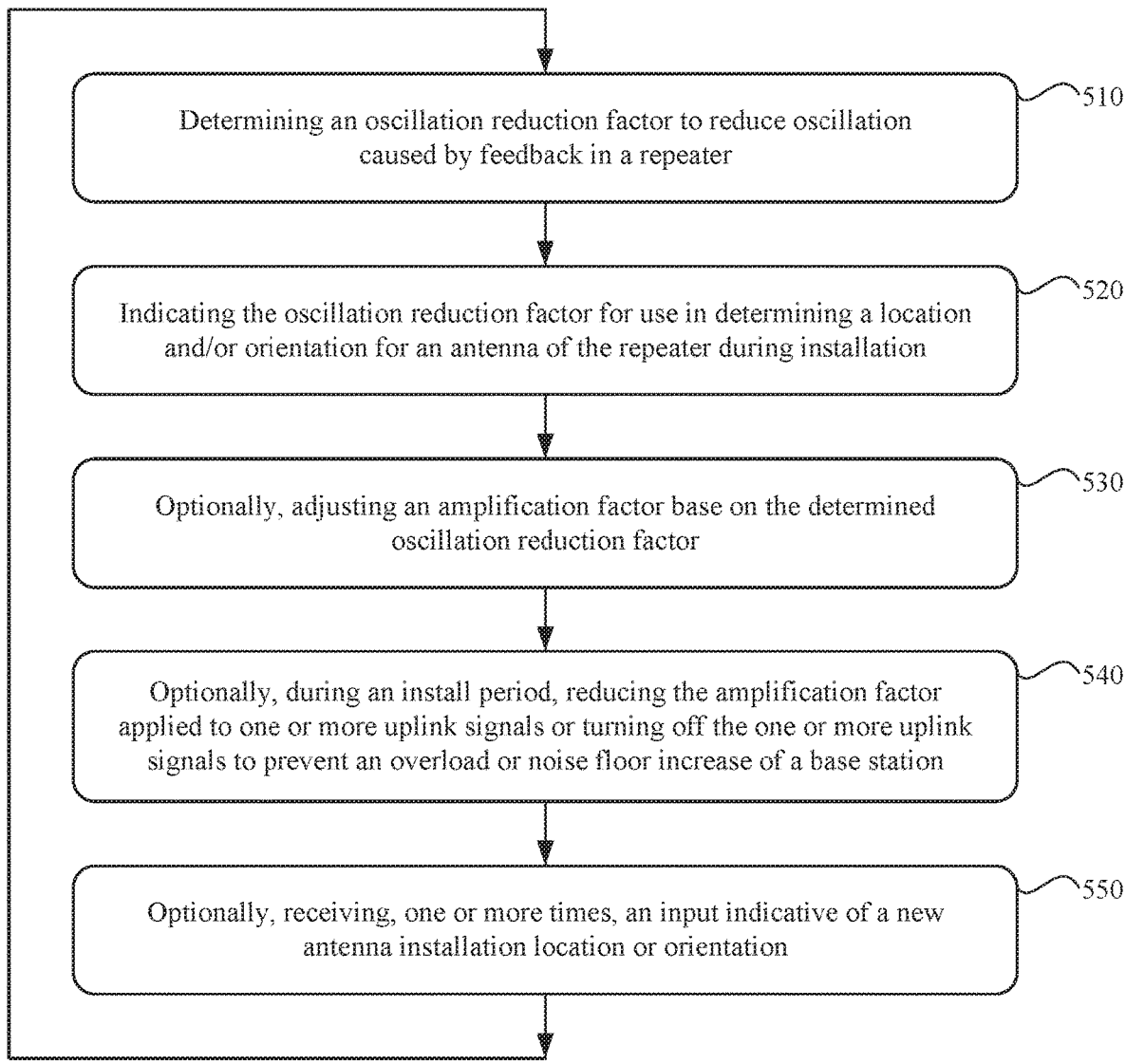
FIG. 5 depicts a method of optimizing gain of a repeater during installation of one or more antennas, in accordance with an example.

FIG. 5 depicts a method of optimizing gain of a repeater during installation of one or more antennas. In one aspect, the method can include determining an oscillation reduction factor to reduce oscillation caused by feedback in a repeater 510. Oscillation can increase the noise in the repeater, saturate the amplifiers of the repeater, and can even damage the repeater. During placement and/or orientation of the repeater antennas, oscillations caused by feedback of uplink and/or downlink signals through the repeater can occur if the antennas are too close to each other. When feedback oscillations are detected, an oscillation factor can be determined such that oscillations are reduced below a specified oscillation margin. For example, a factor of −30 dB for reducing feedback oscillation may be determined.

In one aspect, the oscillation reduction factor can be indicated for use in determining a location and/or orientation for an antenna of the repeater during installation 520. The oscillation reduction factor can be indicated to a user for use in determining an optimal antenna installation location and/ or orientation. For example, the determined oscillation reduction factor of −30 dB can be output on a display of the repeater.

In one aspect, an amplification factor of the repeater can, optionally, be adjusted based on the determined oscillation reduction factor 530. For example, in response to an oscillation reduction factor of −30 dB, the amplification factor of the one or more amplifiers can be reduced by a corresponding −30 dB.

In one aspect, the amplification factor applied to one or more uplink signals can be reduced to a predetermined level during an install period to prevent an overload or noise floor increase of a base station 540. Alternatively, the one or more uplink signals can be turned off during the install period to prevent an overload or noise floor increase of the base station.

In one aspect, an input indicative of a new antenna installation location or orientation can be received 550. In one aspect, the processes of 510 and 520 can be repeated in response to each input indicative of a new antenna installation location or orientation. In addition, the optional processes of 530 and 540 can be repeated, as appropriate, in response to each input indicative of the new antenna installation location or orientation. For example, in response to a first placement and orientation of the repeater antennas, a determined oscillation reduction factor of −30 dB for the first placement and orientation can be output to a user. With the oscillation reduction factor information, the user can try different antenna locations and/or orientations to reduce the oscillation reduction factor and thereby increase the operating gain of the repeater. For example, the user may move the one or more antennas of the repeater and provide an input through one or more keys or buttons of the repeater to indicate the new placement and/or orientation. In response to the new placement and/or orientation, a determined oscillation reduction factor of −10 dB for the second placement and/or orientation may be determined and output to the user.

Figure 6:
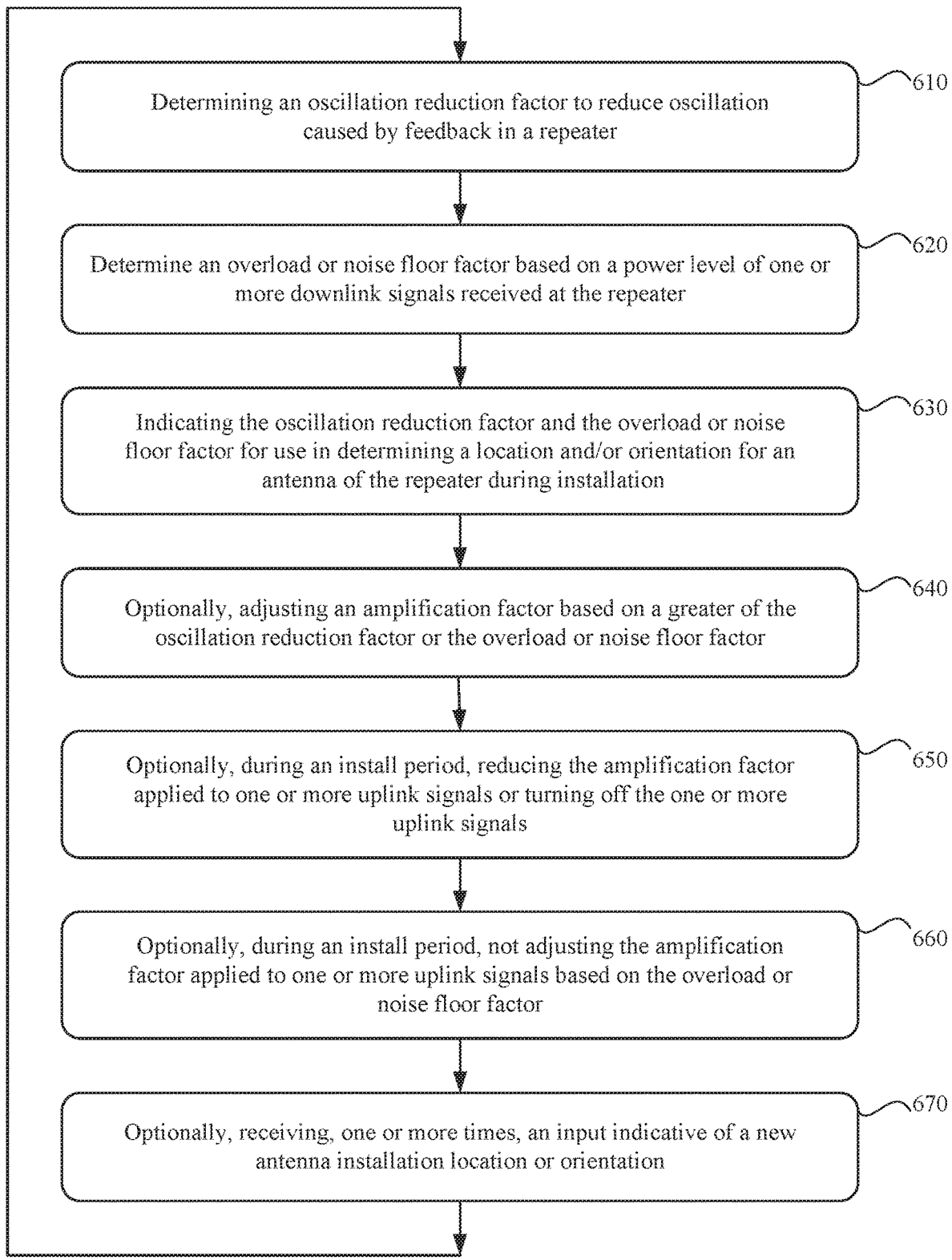
FIG. 6 depicts a method of optimizing gain of a repeater during installation of one or more antennas, in accordance with another example.

FIG. 6 depicts a method of optimizing gain of a repeater during installation of one or more antennas. In one aspect, the method can include determining an oscillation reduction factor to reduce oscillation caused by feedback in a repeater 610. During placement and/or orientation of the repeater antennas, oscillations caused by feedback of uplink and/or downlink signals through the repeater can occur if the antennas are too close to each other. When feedback oscillations are detected, the oscillation factor needed for adjusting an amplification factor can be determined such that oscillations are reduced below a specified oscillation margin. For example, a factor of −30 dB for reducing feedback oscillation may be determined.

In one aspect, an overload or noise floor factor can be determined based on a power level of one or more downlink signals received at the repeater 620. For example, the strength of a downlink signal received from a base station can be determined. When the downlink signal strength from the base station is less than or equal to a predetermined level, the overload or noise floor factor can be set to substantially zero. When the downlink signal strength from the base station is greater than the predetermined level, the overload or noise floor factor can be a function of the how much the signal strength is above the predetermined level. For instance, for each 1 dB above a predetermined level, the overload or noise floor factor may correspond to a 1 dB reduction. For example, a factor of −10 dB for protecting against overload or maintaining a specified noise floor level can be determined when the received download signal is −50 dB and the predetermined level is −60 dB.

In one aspect, the oscillation reduction factor and the overload or noise floor factor can be indicated for use in determining a location and/or orientation for an antenna of the repeater during installation 630. The oscillation reduction factor can be indicated to a user for use in determining an optimal antenna installation location or orientation. For example, the determined oscillation reduction factor of −10 dB and an overload or noise floor factor of −20 dB can be output on a display of the repeater.

In one aspect, an amplification factor of the repeater can, optionally, be adjusted based on the greater of the determined oscillation reduction factor or the overload or noise floor factor 640. For example, when the strength of the downlink signal received from the base station is less than the predetermined level and a −2 dB reduction is needed to reduce feedback oscillation, than the amplification factor can be a value sufficient to reduce one or more signals output from repeater by −2 dB. When the strength of the downlink signal received from the base station is −10 dB above the predetermined level, while only a −2 dB reduction is needed to reduce feedback oscillation, the amplification factor can be a value sufficient to reduce the one or more signals output from the repeater by −10 dB.

In one aspect, the amplification factor applied to one or more uplink signals can be reduced during an install period to prevent an overload or noise floor increase of a base station 650. Alternatively, the one or more uplink signals can be turned off during the install period to prevent an overload or noise floor increase of the base station.

In one aspect, adjustment of the amplification factor based on the overload or noise floor factor can be disabled during at least a portion of an installation period 660. The adjustment of the amplification factor based on the overload or noise floor factor can be disabled for a short period of time so that the oscillation reduction factor can be determined.

In one aspect, an input indicative of a new antenna installation location or orientation can be received 670. In one aspect, the processes of 610-630 can be repeated in response to each input indicative of a new antenna installation location or orientation. In addition, the optional processes of 640-660 can be repeated, as appropriate, in response to each input indicative of the new antenna installation location or orientation. For example, in response to a first placement and orientation of the repeater antennas, a determined oscillation reduction factor of −8 dB and oscillations or noise floor factor of −10 dB for the first placement and orientation can be output to a user. With the oscillation reduction factor and overload or noise floor factor information, the user can try different antenna locations and/or orientations to reduce the oscillation reduction factor. For example, the user may move the one or more antennas of the repeater and provide an input through one or more keys or buttons of the repeater to indicate the new placement and/or orientation. In response to the new placement and/or orientation, a determined oscillation reduction factor of −2 dB and an overload or noise floor factor of −10 dB can be output to the user.

Again, the strength of the signals transmitted between a base station and one or more user devices generally varies over time. Therefore, it may be possible that the determined overload or noise floor factor may be greater during an install period than during subsequent operation of the repeater. In the case where the overload or noise floor factor is greater than the oscillation reduction factor, the overload or noise floor factor in effect covers up the oscillation reduction factor and it may not be apparent to a user that the position and/or orientation of the antennas are too close to each other. For example, if the oscillation reduction factor corresponds to a reduction in the gain to −58 dB and the overload or noise floor factor corresponds to a reduction in the gain to −56 dB, the overload or noise floor factor covers up the oscillation reduction factor. By providing an indication of the oscillation reduction factor, the information can be used to minimize the oscillation reduction factor through optimized placement and/or orientation of one or more of the antennas of the repeater even when the amplification factor is based on the overload or noise floor factor. As a result, during subsequent operating periods when the signal strength of the downlink signal received from the base station decreases such that the overload or noise floor factor is lower and the amplification factor is instead based on the oscillation reduction faction, greater performance of the repeater can be achieved with the reduced oscillation reduction factor due to optimized placement and/or orientation of the antennas. Without an indication of the oscillation reduction factor, when the overload or noise floor gain is greater, an installer would not know to increase the antenna spacing to reduce the oscillation reduction factor. By increasing the separation between the antennas, the operating gain of the repeater can be greater during periods when the overload or noise floor factor drops below than oscillation reduction factor.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry may include hardware, firmware, program code, executable code, computer instructions, and/or software. A non-transitory computer readable storage medium may be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high-level procedural or object-oriented programming language to communicate with a computer system. However, the program(s) may be implemented in assembly or machine language, if desired. In any case, the language may be a compiled or interpreted language, and combined with hardware implementations.

As used herein, the term processor may include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module cannot be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as de facto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology may be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation may be made without the exercise of inventive faculty, and without departing from the principles and concepts of the technology. Accordingly, it is not intended that the technology be limited, except as by the claims set forth below.

What is claimed is:

1. A method of optimizing an initial gain of a repeater comprising:
   disabling an overload protection at the repeater for a base station;
   determining an independent oscillation reduction factor for reducing oscillation in the repeater when the overload protection is disabled at the repeater, wherein the oscillation is caused by feedback of one or more signals between a donor port and a server port of the repeater;
   disabling an oscillation protection at the repeater;
   determining an independent overload or noise floor reduction factor when the oscillation protection is disabled at the repeater based on a power level of a downlink signal, of the one or more signals, at the donor port to enable a user to use the independent oscillation reduction factor and the independent overload or noise floor reduction factor for determining an optimal antenna installation location or orientation.

2. The method according to claim 1, wherein disabling the overload protection at the repeater comprises not adjusting an amplification factor of the uplink signal, at the donor port, based on the independent overload or noise floor reduction factor during an install period.

3. The method according to claim 1, wherein disabling the oscillation protection at the repeater comprises not applying the independent oscillation reduction factor for adjusting an amplification factor of the repeater to reduce an oscillation below a specified gain level for the repeater.

4. The method according to claim 1, further comprising: turning off an uplink signal path while disabling the overload protection during an install period to prevent an overload at a base station during the install period.

5. The method according to claim 1, further comprising: disabling the overload protection at the repeater for a predetermined period of time based on a government regulation.

6. The method according to claim 1, further comprising: adjusting an amplification factor of the downlink signal, at the server port, based on the independent oscillation reduction factor.

7. The method according to claim 6, further comprising: adjusting the amplification factor of the uplink signal, at the donor port, based on a greater of the independent oscillation reduction factor or the independent overload or noise floor reduction factor.

8. The method according to claim 7, wherein,
   the independent oscillation reduction factor is determined periodically during an install period; and
   the amplification factor of the uplink signal, at the donor port, is not adjusted based on the independent overload or noise floor gain reduction factor when the independent oscillation reduction factor is being determined.

9. A method of optimizing gain in a repeater during installation comprising:
   determining an independent oscillation reduction factor for reducing oscillation caused by feedback in the repeater,
   wherein the independent oscillation reduction factor is determined when an overload protection is disabled at the repeater to enable a user to use the independent oscillation reduction factor and the independent overload or noise floor reduction factor for determining an optimal antenna installation location or orientation;
   wherein the disabling comprises not adjusting an amplification factor of an uplink signal, at a donor port, based on the independent overload or noise floor reduction factor during an install period.

10. The method according to claim 9, further comprising:
    adjusting an amplification factor of the repeater based on the independent oscillation reduction factor.

11. The method according to claim 10, further comprising:
    during an install period disabling adjustment of the amplification factor of the repeater based on a criterion other than the independent oscillation reduction factor.

12. The method according to claim 10, further comprising:
    during an install period disabling adjustment of the amplification factor of the repeater based on an overload factor.

13. The method according to claim 10, further comprising:
    during an install period disabling adjustment of the amplification factor of the repeater based on a noise floor factor.

14. The method according to claim 10, further comprising:
    determining the independent oscillation reduction factor for reducing oscillation cause by feedback below a specified oscillation margin.

15. The method according to claim 10, further comprising:
    during the install period reducing the amplification factor for one or more uplink signals to prevent an overload or noise floor increase of a base station.

16. The method according to claim 9, further comprising:
    determining an independent overload or noise floor factor when an oscillation protection is disabled at the repeater based on a power level of one or more downlink signals at the repeater; and
    indicating to the user the independent overload or noise floor factor for use in determining the optimal antenna installation location or orientation.

17. The method according to claim 16, further comprising:
  while determining the independent oscillation reduction factor, disabling adjustment of the amplification factor of the repeater based on the independent overload or noise floor factor.

18. The method according to claim 16, further comprising:
  turning off one or more uplink signal paths during an install period to prevent an overload of a base station during the install period.

19. The method according to claim 16, further comprising:
  adjusting the amplification factor of the repeater based on the independent oscillation reduction factor from a bumped-up gain level.

20. The method according to claim 16, further comprising:
  indicating to the user both the independent oscillation reduction factor and the independent overload or noise floor factor.

21. The method according to claim 9, further comprising:
  receiving, one or more times, an input indicative of a new antenna installation location or orientation;
  determining the independent oscillation reduction factor in response to each input indicative of the new antenna installation location or orientation; and
  indicating to a user the independent oscillation reduction factor determined in response to each input indicative of the new antenna installation location or orientation.

22. A method of configuring a repeater comprising:
  determining an independent oscillation reduction factor for reducing oscillation in the repeater when an overload protection is disabled at the repeater,
  wherein the oscillation is caused by feedback of one or more signals between a donor port and a server port of the repeater to enable a user to use the independent oscillation reduction factor and the independent overload or noise floor reduction factor for determining an optimal antenna installation location or orientation;
  wherein the disabling comprises not adjusting an amplification factor of an uplink signal, at a donor port, based on the independent overload or noise floor reduction factor during an install period.

23. The method according to claim 22, further comprising:
  adjusting an amplification factor of a downlink signal, of the one or more signals, at the server port based on the independent oscillation reduction factor.

24. The method according to claim 23, further comprising:
  adjusting the amplification factor of an uplink signal, of the one or more signals, at the donor port based on the independent oscillation reduction factor.

25. The method according to claim 23, further comprising:
  during an install period disabling adjustment of the amplification factor of the one or more signals based on the independent overload or noise floor gain reduction level.

26. The method according to claim 22, further comprising:
  receiving, one or more times, an input indicative of a new antenna installation location or orientation;
  determining the independent oscillation reduction factor in response to each input indicative of the new antenna installation location or orientation; and
  indicating the independent oscillation reduction factor determined in response to each input indicative of the new antenna installation location or orientation.

27. The method according to claim 26, wherein the antenna includes a donor antenna.

28. The method according to claim 26, wherein the antenna includes a server antenna.

29. A repeater comprising:
  a user interface;
  a donor port;
  a server port;
  one or more downlink amplifiers coupled between the donor port and the server port;
  one or more uplink amplifiers coupled between the donor port and the server port; and
  processing logic configured to,
    determine an independent oscillation reduction factor for reducing oscillation in the repeater when an overload protection is disabled at the repeater,
    determine an independent overload or noise floor factor when an oscillation protection is disabled at the repeater based on a power level of a downlink signal of the one or more signals at the donor port,
    wherein the oscillation is caused by feedback of one or more signals between the server port and the donor port of the repeater to enable user to use the independent oscillation reduction factor for determining an optimal antenna installation location or orientation,
    disable the overload protection at the repeater, wherein an amplification factor of the one or more signals, at the donor port, are not adjusted based on the independent overload or noise floor reduction factor during an install period.

30. The repeater of claim 29, wherein the processing logic is further configured to,
  adjust an amplification factor of the one or more downlink amplifiers based on the independent oscillation reduction factor.

31. The repeater of claim 29, wherein the processing logic is further configured to, receive, one or more times, an input from the user interface indicative of a new antenna installation location or orientation.

32. The repeater of claim 29, wherein the processing logic is further configured to,
  indicate the independent overload or noise floor factor during the install period on the user interface.

* * * * *